Dec. 17, 1946. S. H. STUPAKOFF 2,412,925
PRODUCTION OF FUSED ARTICLES
Filed Sept. 14, 1942

INVENTOR
Semon H. Stupakoff
by his attorneys
Christy, Parmelee, Strickland

Patented Dec. 17, 1946

2,412,925

UNITED STATES PATENT OFFICE 2,412,925

PRODUCTION OF FUSED ARTICLES

Semon H. Stupakoff, Latrobe, Pa., assignor to Stupakoff Ceramic & Manufacturing Co., Latrobe, Pa., a corporation of Pennsylvania Application September 14, 1942, Serial No. 458,253

4 Claims. (Cl. 49—77)

This invention pertains to the production of articles formed principally of fused alumina or other fusible materials and oxides and particularly to the manufacture of synthetic jewels from alumina and to the production of fused alumina or other compounds in masses of predetermined shape. The invention is especially applicable to the manufacture of jewels for use in watches and for bearings in other instruments and to the manufacture of other articles, such as crucibles, tools, wire drawing dies, or other objects.

According to the usual practice of manufacturing artificial jewels, particularly those intended for watch movements and similar purposes, alumina in small amounts is fused in an oxy-acetylene flame. As the alumina is fused, additional increments of powdered alumina are added to the mass until a body of fused alumina of substantial size is produced. The alumina contains such added impurities as may be necessary for producing the desired color, chromium oxide being employed where a red ruby is to be produced; magnesium oxide, zinc oxide and cobalt being employed where an emerald is to be produced, and a small amount of nickel is employed where a topaz is to be produced. After a mass has been fused in this way, it is broken or divided into pieces and those parts which have been properly fused are separated out from the mass. These in turn are sub-divided into small pieces from which the jewels for watch movements and the like are made.

According to the present invention a method is provided whereby the alumina or other compound is fused to a predetermined shape whereby the finished jewels can be produced with considerably less machining and polishing than is necessary for the production of jewels at the present time. It is contemplated, for example, that if the jewel is to be in the form of a disk, the alumina will be fused initially into the form of a cylindrical rod, and to produce the disk it is merely necessary to slice or cut the rod transversely to form disks or shorter cylinders. According to the present invention, it is also contemplated that the preformed jewels may be manufactured with holes in them where the jewel is intended to have a hole to provide a bearing for the end of the spindle. While the invention is particularly intended for the manufacture of fused aluminum oxide for use as jewels in horological and precision instruments, it is also adapted to the manufacture of various articles of fused compounds in any desired shape and for any desired purpose, especially where the article is to have a dense non-porous structure. Some other materials than alumina to which this invention applies are magnesia, berylia, zirconia, and other refractory oxides, also silicates of alumina and even high-temperature glasses.

The invention may be readily understood by reference to the accompanying drawing in which Figure 1 represents a longitudinal section through an encased mass of material in preparation for fusing;

According to the present invention and as one example of it, alumina of a high degree of purity is reduced to a finely divided state, and mixed with the alumina where desired are such added substances as may be used to impart color to the resulting gem. For example, to produce a red ruby, the mix may comprise $97\frac{1}{2}\%$ of $Al_2O_3$ and $2\frac{1}{2}\%$ of $CRO_2$. In case that a yellow-colored stone is to be produced, the mix may comprise $99\frac{1}{2}\%$ of $Al_2O_3$ and $\frac{1}{2}\%$ of $NiO_2$. To produce a green color, magnesium oxide, zinc oxide and cobalt oxide are employed in small percentages.

Figure 1:
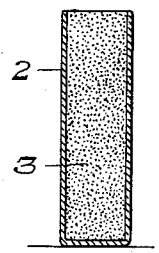
Figure 3:
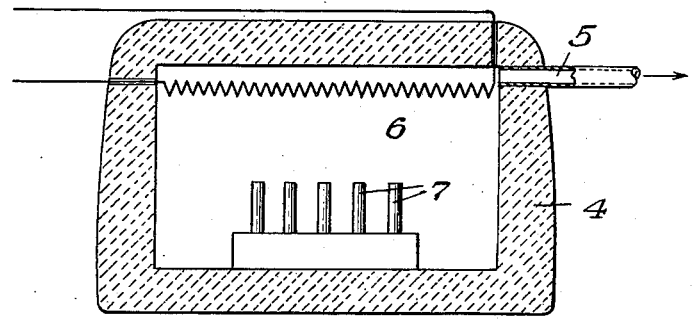
Figure 3 is a more or less schematic view to illustrate the fusion of the mass in an atmosphere which is in itself non-oxidizing.

When the aluminum oxide, together with such coloring ingredients as may be employed has been reduced to a finely divided state, it is packed into a metal shell or container of a shape and dimension corresponding to the shape and dimension of the mass of fused alumina to be produced, the metal being a metal which has a melting point higher than the fusing temperature of the alumina. For example, if a cylindrical mass of fused alumina is to be produced, the prepared oxide of aluminum is packed into a metal sleeve shown in Figure 1 wherein 2 designates a refractory metal sleeve, and 3 is the powdered alumina together with such coloring ingredients as may be employed. Suitable refractory metals for the purpose are molybdenum, tungsten and tantalum, or carbon may be used. The cylinder 2 in Figure 1 is formed of one of these metals or from a combination of them. After the tube has been tightly packed, it is charged into a furnace in which a non-oxidizing environment is maintained and is heated to a temperature sufficient to fuse the alumina. An electric furnace is preferable, and the inert environment is preferably procured by exhausting the air from the interior of the furnace. This is illustrated in Figure 3 wherein 4 designates a furnace and 5 is a connection through which gases are exhausted from the chamber 6 of the furnace. Instead of exhausting the gases from the interior of the furnace, some inert gas may be employed as for example, hydrogen or nitrogen, but a pressure below atmospheric pressure is preferred as it accelerates the removal of entrained air and gases from the aluminum oxide as the oxide fuses.

In the furnace the heating is maintained until the mass 3 has completely fused. Since the metal 2 has a melting point higher than the fusing temperature of the aluminum oxide, the shell remains intact and the alumina fuses to the shape of the surrounding shell. It is, of course, necessary to maintain an inert atmosphere in the furnace during the fusing of the alumina as the metals above referred to will oxidize readily at temperatures much below the fusing temperature of the alumina.

In Figure 3 a number of the prepared charges are illustrated within the furnace chamber, these being designated generally as 7, and they are made up as described in connection with Figure 1. Instead of being cylindrical, however, the metal shells may be rectangular or of any other shape.

Figure 2:
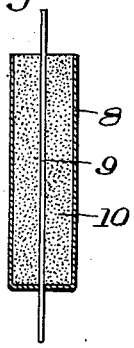
Figure 2 is a section through a mass of aluminum oxide or other material in a container such as may be used for the manufacture of perforated jewels.
Figure 4:
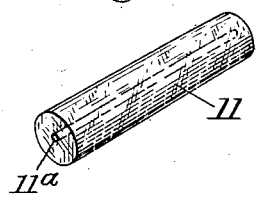
Figure 4 is a perspective view of a completed mass of a fused article made in accordance with the present invention.

After the charges have been in the furnace a sufficient length of time to fuse the alumina and remove the entrained gases, the charges in the furnace are allowed to cool. The fused alumina will of course freeze on cooling, and it will also be fused to the refractory metal shell 2. In order to separate the fused alumina from the refractory metal shell, the charge is then heated up in an oxidizing atmosphere to the point where the refractory metal will oxidize, but to a temperature considerably below the fusing point of the alumina. When the refractory metal shell has been oxidized, the resulting oxide will separate readily from the fused alumina, and a dense mass of fused alumina of a predetermined shape will be secured. This is illustrated in Figure 4 which illustrates a cylindrical body of fused alumina of predetermined shape and dimensions. In Figure 4 the completed article 11 is illustrated as having a central hole 11a extending axially therethrough. Where the article is to have a hole, a core of a refractory metal is used, as well as a surrounding shell. In this case the charge is prepared as shown in Figure 2 where 8 designates a refractory metal shell and 9 is a core of refractory metal centrally positioned in the shell, and 10 is the fusible mass from which the gem is to be produced. In this case the procedure is similar to that previously described and followed, but after the alumina has been fused, the core 9, in addition to the shell 8, is disintegrated by oxidation or by other means, thereby producing a central hole 11a through the body 11, the hole having a diameter equal to the diameter of the core. The core may be a tube, or a solid wire, but a hollow core or tube is preferable because it can be more readily destroyed. For the manufacture of jewels for use in watches, it is understood that the fused mass will be smaller than is represented by the drawing.

Instead of the core and the shell being removed by heating and oxidation, the shell may be disintegrated through the use of suitable chemicals.

Figure 5:
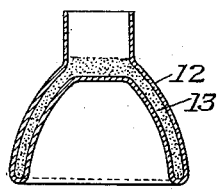
Figure 5 is a transverse section through another metal form to be used in the making of vessels, such as crucibles.
Figure 6:
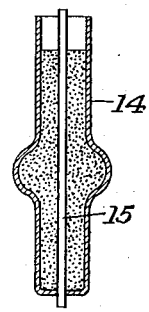
Figure 6 is a view similar to Figure 2 showing the adaptation of the invention to other shapes, such as spark plug insulators.
Figure 7:
Figure 7 shows the application of my invention for the manufacture of a plate-like object having a number of perforations therein.

While the drawing shows the production of fused alumina articles of elongated shape, it will be understood that this is merely for the purpose of illustration and that the supporting metal shell may have any shape desired. For instance, it is contemplated by the present invention that should it be desired to make a receptacle such as a small crucible of fused aluminum oxide, a suitably shaped metal shell may be employed in the same manner and that various other shapes of articles can be produced. This is illustrated in Figure 5 where 12 is a metal shell having spaced outer and inner walls with a space 13 into which the refractory is charged and fused. After the article has been formed, the shell which in Figure 5 is inverted, is disintegrated. Likewise, in Figure 6, the shell 14 has a bulge intermediate its ends and the form also has a core 15 which is preferably tubular. This form may be used to make a shape such as a spark plug insulator. In Figure 7, the metal form 16 is in the form of a shallow tray with hollow studs 17 for making a plate-like object with holes through it.

One important advantage of the present invention from the standpoint of making jewels for watches or precision instruments is that the jewels can be manufactured with a perforation therein where necessary and that they can be manufactured close to the final dimension in some directions, thus very considerably reducing the grinding and polishing operations which are necessary to convert masses of fused alumina as now produced into jewels of usable shape and size. Also, by fusing the alumina in a vacuum or inert atmosphere of reduced pressure, the fused mass upon cooling has a much more dense structure and is to a large extent free of flaws which would impair the use of the material for jewels for watches and other instruments where the presence of even a very small flaw may render the jewel unfit for use.

In the foregoing description, particular reference has been made to fused alumina, as it is in connection with this material that the invention at present has a preferred importance, but the same procedure may be followed using other refractory oxides or ceramic substances as for example, magnesium oxide, zirconia, beryllia, silicates of alumina and even in special cases, glass. Where the material used has a melting point substantially lower than that of alumina, the metal of which the form is made need not be a refractory metal. A metal such as copper may be used in such circumstances, as the copper can be easily disintegrated by chemical action after the fusing of the article has been completed. The particular advantage in using this method with even such material as glass, is because it permits of shapes and objects which can now not be formed or can be formed only with considerable expense or difficulty, being manufactured. For example, present methods of forming glass articles are not suitable to the forming of holes in a relatively thick disk of glass. This invention permits of forming holes through the use of a metal form, preferably hollow, which can be removed by some destructive process after the article has been shaped.

While I have illustrated and described certain preferred embodiments of my invention, it will be understood that various changes and modifications may be made therein and that articles of various shapes may be produced, all within the contemplation of my invention and under the scope of the following claims, and it is intended that the term "fused alumina" shall apply to articles formed of substantially pure alumina or to articles which, except for a few per cent. of foreign substances, such as exist for example in natural jewels comprised basically of alumina, are otherwise comprised of alumina.

I claim as my invention:

1. The method of forming a mass of a fused non-metallic refractory compound with a hollow therethrough which comprises fusing the mass about a tubular metal core adapted to form the hole, the core being comprised of a metal having a melting temperature above that of the mass, the fusing of the mass being effected in an atmosphere which is inert to the metal, and after the metal has been fused and has congealed, heating the mass in an oxidizing atmosphere to disintegrate the metal, but to a temperature below the temperature at which the refractory material melts.

2. The method of forming fused masses of alumina of predetermined form which comprises charging alumina in a finely divided state into a refractory metal shell of a desired shape, the shell being formed of a metal whose melting point is higher than that of the alumina, heating the alumina to its fusing temperature but below the melting temperature of the refractory shell in an atmosphere inert to the refractory metal shell, cooling the mass and then oxidizing the refractory metal.

3. The method of forming a mass of fused refractory oxide which comprises charging finely divided oxide into a metal mold, heating the mass to a temperature where the oxide melts and fuses in an atmosphere which is inert to the metal mold and below the melting temperature of the metal mold, and after the fused mass has congealed, again heating the mass in an oxidizing atmosphere to destroy the mold but to a temperature below the melting point of the mass.

4. The method of making synthetic jewels, which comprises fusing alumina in a refractory metal mold having a melting point higher than the melting point of alumina, carrying out the fusing of the alumina in a non-oxidizing environment, and thereafter separating the alumina from the mold by admitting an oxidizing atmosphere into the said environment until the mold becomes oxidized and disintegrated away from the alumina, the oxidation of the mold being effected at temperatures below the fusing point of alumina.

SEMON H. STUPAKOFF.